United States Patent [19]

Imagawa

[11] Patent Number: 4,620,388

[45] Date of Patent: Nov. 4, 1986

[54] INSECT KILLING SYSTEM

[75] Inventor: Masami Imagawa, Kagoshima, Japan

[73] Assignee: Sansyu Sangyo Kabushiki Kaisha, Kagoshima, Japan

[21] Appl. No.: 647,030

[22] Filed: Sep. 4, 1984

[30] Foreign Application Priority Data

Sep. 14, 1983 [JP] Japan .................................. 58-171020

[51] Int. Cl.⁴ ............................................ A01M 19/00
[52] U.S. Cl. ...................................... 43/130; 422/26; 422/305
[58] Field of Search ......................... 43/130, 129, 125; 422/26, 32, 305

[56] References Cited

U.S. PATENT DOCUMENTS

| | | | |
|---|---|---|---|
| 3,086,837 | 4/1963 | Wilkinson | 422/26 |
| 3,454,352 | 7/1969 | Lamboy | 422/26 |
| 3,897,818 | 8/1975 | Champel | 422/26 |
| 4,411,918 | 10/1983 | Cimino | 422/32 |

FOREIGN PATENT DOCUMENTS

| | | | |
|---|---|---|---|
| 2710968 | 9/1977 | Fed. Rep. of Germany | 422/26 |
| 224951 | 12/1942 | Switzerland | 43/130 |
| 1341705 | 12/1973 | United Kingdom | 422/26 |

Primary Examiner—Gene P. Crosby
Attorney, Agent, or Firm—Hoffmann, Dilworth, Barrese & Baron

[57] ABSTRACT

An insect killing system is disclosed which comprises a circulation chamber within which steam is allowed to flow and circulate in a transverse or horizontal direction and a differential insect killing cell which forces the steam within the circulation chamber to flow in a vertical direction. In this insect killing system, by guiding the steam in the circulation chamber maintained at preselected temperature and humidity into the differential insect killing cell, the product temperature of fruit core temperature of raw fruit can be maintained at a desired level so as to kill out the maggots and eggs of insect pests such as orange flies and melon flies attaching to the raw fruit contained within the differential insect killing cell.

4 Claims, 4 Drawing Figures

INSECT KILLING SYSTEM

BACKGROUND OF THE INVENTION

1. Field of the Invention

The present invention relates to an insect killing system used for killing insect pests such as orange flies (*strumeta dorsalis*) and melon flies (*aulacophora femoralis*) which stick to raw fruit such as papayas, mangos, green peppers or the like.

2. Description of the Prior Art

It has been conventionally known that maggots or eggs of insect pests such as orange flies or melon flies sticking to papayas, mangos or the like could be killed out by means of a steaming treatment (under the operating conditions of: temperatures within a killing system of 43°–49° C.; fruit core (product) temperatures of 41°–41.7° C.; a humidity of 90%–100%; and, a treatment time of 3 hours.). Such treatment, however, has not been put to practical use so far, because it requires a high accuracy for the temperature and humidity conditions. In other words, in case of small-scale or experimental steaming treatments, the above-mentioned temperature and humidity conditions can be maintained constant for the treatment hours, but it has been found difficult to steam treat raw fruit on a large scale. For example, in case when the raw fruit is contained in a harvest box, it is difficult to satisfy the above-mentioned preselected temperature and humidity conditions for the raw fruit which is located in the center of the harvest box, and thus it is not possible to kill out the maggots and eggs of the orange flies attaching to all of the raw fruit.

SUMMARY OF THE INVENTION

Accordingly, it is a primary object of the invention to provide a system which is capable of steam treating on a large scale the raw fruit such as mangos to which the maggots and eggs of orange flies and melon flies are attaching to kill out these maggots and eggs completely.

In brief, this object can be attained by providing an insect killing system comprising a circulation chamber for circulating and flowing steam transversely therein and a differential insect killing cylinder for forcibly flowing the steam within the circulation chamber in a vertical or longitudinal direction, in which the product temperature of raw fruit to be treated can be maintained at a preselected level by flowing the steam within the circulation chamber maintained at preselected temperature and humidity into the the differential insect killing cell to kill out the maggots and eggs of orange flies and melon flies attaching to the raw fruit contained in the differential insect killing cylinder.

It is another object of the invention to provide an insect killing system which is simple in structure.

In accomplishing this object, according to the invention, the differential insect killing cell to be provided in the circulation chamber is constructed to comprise a cover member formed of a flexible and non-air-permeable (impermeable) material such as a vinyl chloride sheet for covering the outer peripheral surfaces of piled-up harvest boxes containing the raw fruit therein, and a hood equipped with a differential fan on its top surface. Thus, when the differential fan is operated, then the cover member is attracted to the side walls of the harvest boxes to form the differential insect killing cell. As a result of this, the steam within the circulating chamber is sucked from the bottom portions of the harvest boxes into the differential insect killing cell and is then discharged from the top portion thereof via the hood into the circulation chamber.

It is still another object of the invention to provide an insect killing system in which steam of preselected temperature and humidity can be supplied throughout the circulation chamber.

To achieve this object, according to the invention, there are provided a first air blower for air feeding on one of the side walls of the circulation chamber and a second air blower for air suction on the other side wall thereof, and also there is provided between these two air blowers a circulation duct which contains a steam generator, a heating device, a cooling device and the like, thereby permitting the steam to flow in a transverse direction within the circulation chamber.

Upon further study of the specification and appended claims, further objects, features and advantages of the present invention will become more fully apparent to those skilled in the art to which the invention pertains.

BRIEF DESCRIPTION OF THE DRAWINGS

In the drawings, like reference characters and numerals represent like or corresponding components throughout the drawings.

DETAILED DESCRIPTION OF A PREFERRED EMBODIMENT OF THE INVENTION

Figure 1:
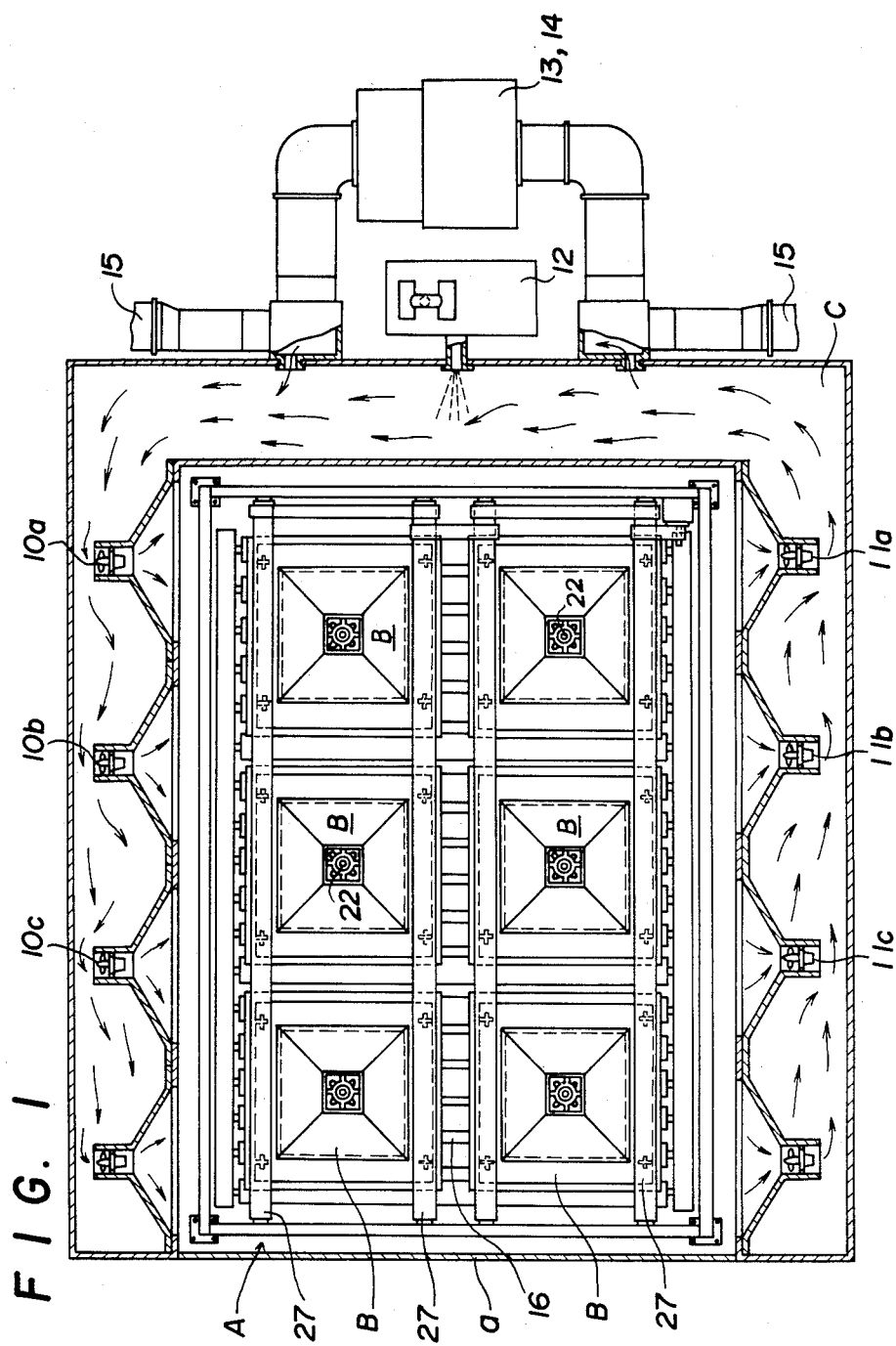
FIG. 1 is a partially cutaway plan view of an embodiment of the invention.
Figure 2:
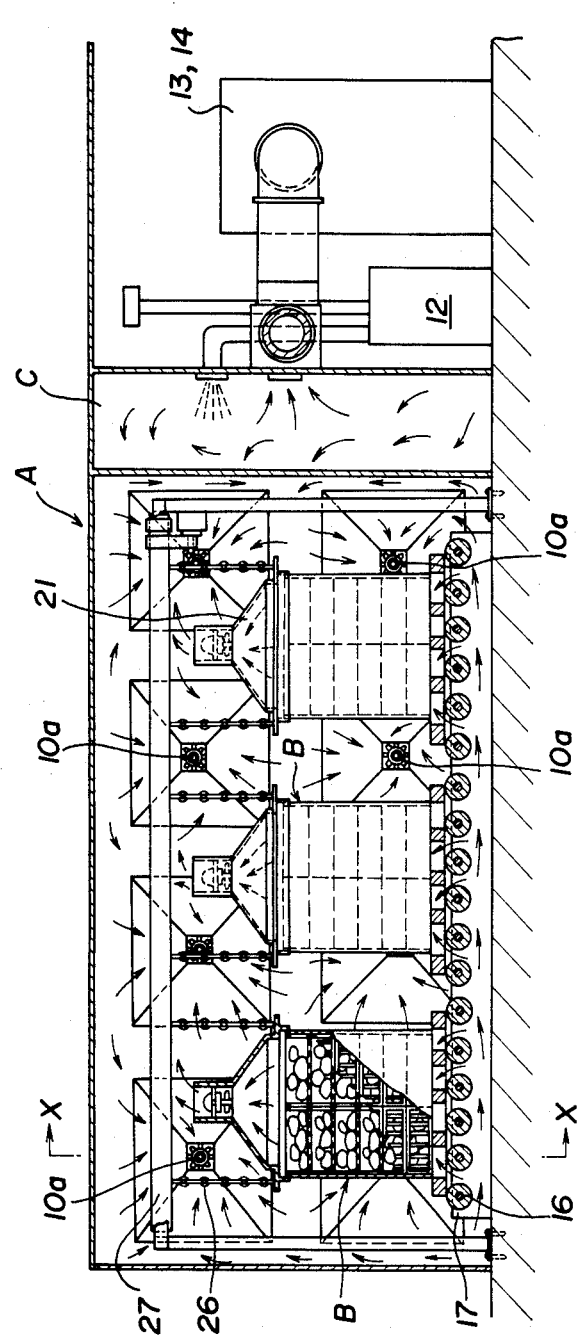
FIG. 2 is a longitudinal side sectional view of the same.
Figure 3:
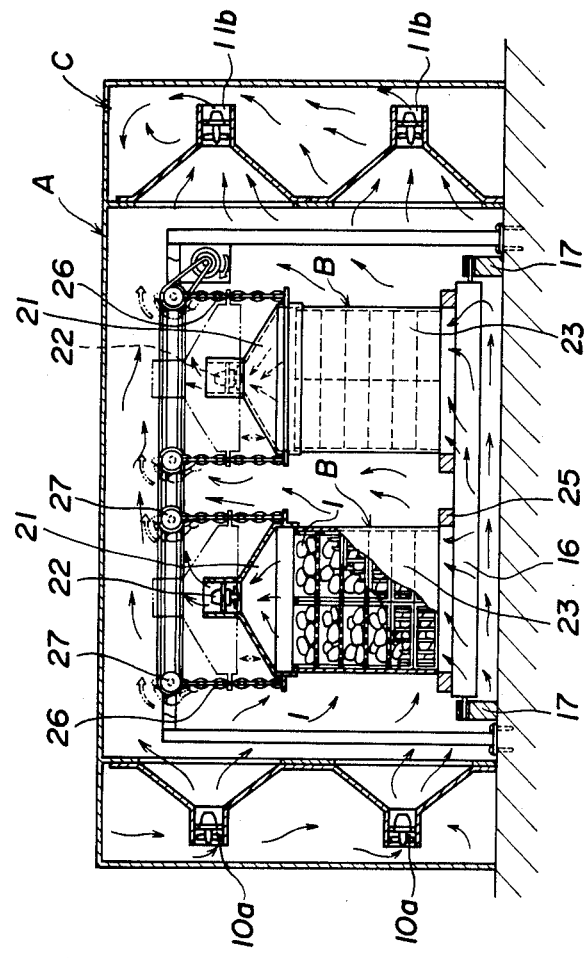
FIG. 3 is a longitudinal sectional view taken along line X—X in FIG. 2.

FIGS. 1–3 illustrate an insect killing system of the invention. In the drawings, reference character (A) stands for a circulation chamber, and characters (B) (B)—denote differential insect killing cells provided within the circulation chamber (A) respectively.

The circulation chamber (A) is provided on its opposed side walls with air blowers (10a), (10b), (10c), (11a) (11b), (11c) so that steam is allowed to flow in a horizontal direction (that is, transverse direction) within the circulation chamber (A). In the drawings, character (C) designates a circulation duct which serves to feed a preselected steam into the circulation chamber (A). This circulation duct (C) is equipped with a steam generator (12), a heating device (13), a cooling device (14), discharge ports (15) (15) and the like necessary to maintain the temperature and humidity inside the circulation chamber (A) at preselected levels respectively. These facilities are automatically operated or stopped in accordance with a sensor provided in the circulation chamber (A).

The circulation chamber (A) is provided on its floor surface with roller conveyors (16) (17) to facilitate operations for taking in and out the raw fruit such as green pepper (1) loaded on board a pallet (25). There is a space between the roller conveyors (16) (17) and the floor surface of the circulation chamber (A) underlying these roller conveyors (16) (17), through which space the steam contained within the circulation chamber (A) is sucked into the differential insect killing cells (B) (B)—. In the drawings, (a1) represents a door for opening or closing the circulation chamber (A).

Figure 4:
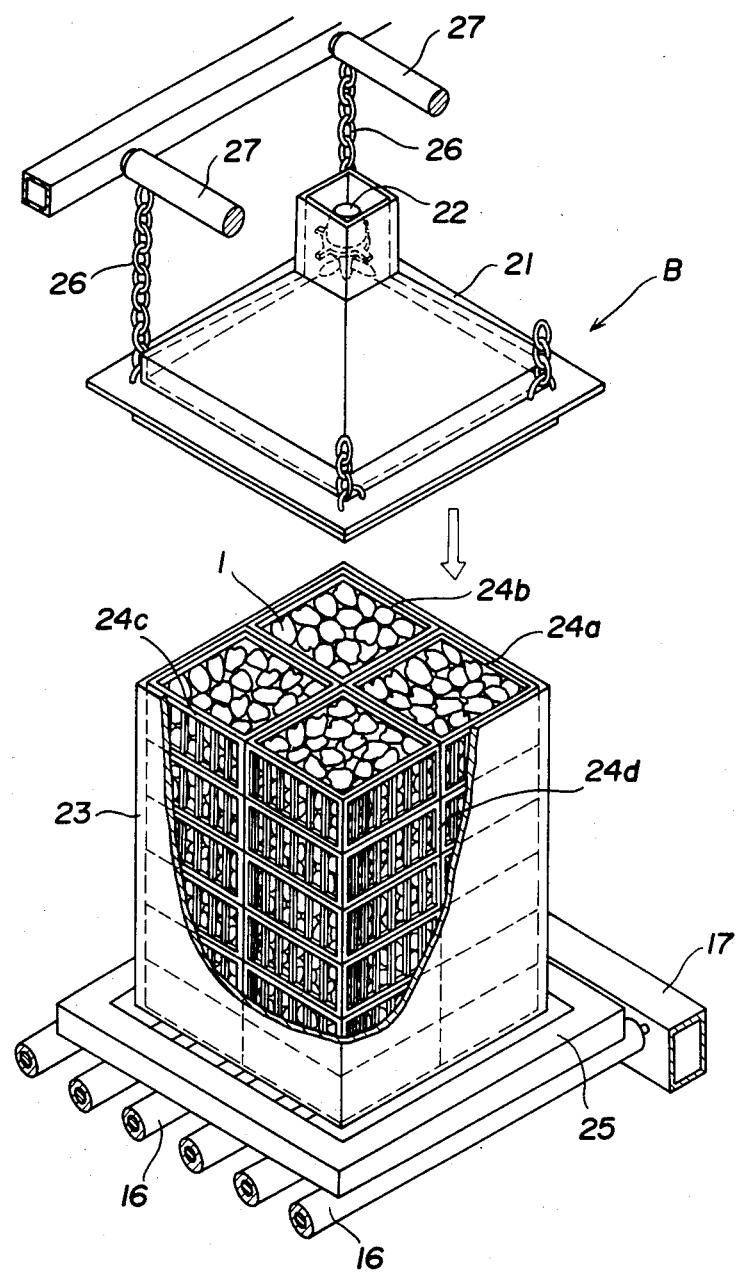
FIG. 4 is an exploded perspective view of a differential insect killing cell employed in the invention.

Now, FIG. 4 illustrates an example of the differential insect killing cells (B) (B)—employed in the invention. It comprises a hood (21) adapted to be moved vertically by winding means (26) (27), a differential fan (22) mounted onto the top portion of the hood (21), and a cover member (23) for covering the outer peripheral surfaces of harvest boxes (24a) (24b) (24c) (24d)—which contain the green peppers (1) therein and are carried on a pallet (25). The differential fan (22) is a variable air blower which can be adjusted in number of revolution in accordance with amounts of the green peppers contained in the harvest boxes (24a)—, the actual states of the contained green peppers and the like. When the differential fan (22) is operated, the steam contained in the bottom portion of the circulation chamber (A) is sucked through clearances between the roller conveyors (16) (17) and the pallet (25) into the differential insect killing cells (B), and is then blown via the hood (21) into the upper portions of the circulation chamber (A). Thus, this differential fan (22) can be used to maintain the product temperature of the green peppers (1) contained in the differential insect killing cell (B) at a predetermined level.

The cover member (23) forming a component of the above-mentioned differential insect killing cell (B) is formed of a flexible and air-impermeable material such as a vinyl chloride sheet or film and also serves to cover the outside peripheral surfaces of the harvest boxes (24a) (24b)—containing the green peppers (1), which harvest boxes have been piled up on one another, side by side and back and forth on the pallet (25). This cover member (23) is attracted to the outside peripheral surfaces of the harvest boxes (24a) (24b)—due to the force of attraction produced by operation of the differential fan (22). Each of the harvest boxes (24a) (24b)—has an open top surface and is also formed with a large number of ventilating holes in its side walls and bottom plate.

In other words, the green peppers that have been harvested in the fields and packed into the harvest boxes (24a)—are carried on board the pallet (25), forwarded to the circulation chamber (A), and fed on board the roller conveyor (16) into a location just below the hood (21) that is a component of the differential insect killing cell (B). Next, the outer peripheral surfaces of the harvest boxes (24a)—on board the pallet (25) are covered up by the cover member (23), and the hood (21) is then moved down to cover the open upper surfaces of the harvest boxes (24a) (24b)—. Thereafter, the circulation chamber (A) is closed and the steam generator (12) and heating device (13) equipped in the circulation duct (C), the air blowers (10a)—, (11a)—, and the differential fan (22) of the differential insect killing cell (B) are operated. Consequently, a stream of circulation air is allowed to flow in a transverse (horizontal) direction within the circulation chamber (A) so as to maintain the temperature and humidity within the circulation chamber (A) at the preselected levels.

Then, since the cover member (23) provided around the outside peripheral surfaces of the harvest boxes (24a)—is caused to stick fast to these outside peripheral surfaces of the harvest boxes (24a)—due to the operation of the differential fan (22) and thus to close the ventilating holes on the outside surface side of the harvest boxes (24a)—, the steam contained within the circulation chamber (A) is sucked into the differential insect killing cell (B) from bottom, is passed through the green peppers (1) in the harvest boxes (24a)—, is blown from the upper portion of the differential insect killing cell (B) into the circulation chamber (A), and is spread around within the circulation chamber (A). In this way, the product temperature or fruit core temperature of the green peppers (1) within the differential insect killing cell (B) can be maintained at a preselected level.

If the above-mentioned operation is carried out 3 hours or so continuously, then the maggots and eggs of the orange flies and melon flies attaching to the green peppers (1) in each of the harvest boxes (24a)—can be killed out completely.

It should be noted that the above-mentioned steam treatment for killing the insect pests sticking to the green peppers (1) can be accomplished effectively without shrinking the green peppers (1) themselves or impairing their complexion and elasticity.

In one form the steam is allowed to flow in a transverse direction within the circulation chamber and flow in a vertical direction within the differential insect killing cells. But, as shown in the drawings, the steam can flow in a vertical direction within the circulation chamber (particularly when a duct is provided in the circulation chamber to encourage this type of flow), and flow in a vertical direction within the differential insect killing cells. Of course, when the insect killing cells are arranged horizontally with their central axis aligned coaxially in a horizontal line, the steam would flow in a vertical direction within the circulation chamber and in a transverse direction within the differential insect killing cells.

As has been discussed hereinbefore, the present invention comprises a circulation chamber in which steam is allowed to circulate and flow in a transverse or horizontal direction, and a differential insect killing cell which forces the steam within the circulation chamber to flow in a vertical direction, and is characterized in that after raw fruit to which insect pests such as orange flies and melon flies are attaching is stored within said differential insect killing cell, the steam is used to kill out these insect pests. Therefore, according to the invention, the steam can be fed around the raw fruit evenly and thus the product temperature of the raw fruit can be maintained at a predetermined level. In other words, since the product temperature of the raw fruit can be accurately maintained at a desired temperature for killing insect pests, the insect pests such as the orange and melon flies attaching to the raw fruit can be killed out completely without impairing the quality of the raw fruit.

What is claimed is:

1. An insect killing system for killing insect pests such as orange flies and melon flies, comprising:
   a circulation chamber in which steam is allowed to circulate;
   a plurality of differential insect killing cells with each cell having an open upper top portion and an open bottom portion, in which said steam is forced to flow there through, said plurality of differential insect killing cells accommodating a large number of raw fruits with said insect pests attached thereto and being arranged within said circulation chamber;
   first blower means for circulating said steam in said circulation chamber; and
   second blower means for forcing said steam to flow through each of said plurality differential insect killing cells, whereby said steam is applied to each of said raw fruits and kills out said insect pests attached to said raw fruits.

2. The insect killing system according to claim 1 wherein said first blower means for circulating said steam in said circulation chamber comprises a plurality of blowers for air feeding provided on one of the opposed side walls of said circulation chamber and a plurality of blowers for air suction provided on the other of said side walls, and wherein said second blower means for forcing said steam to flow through each of said plurality of differential insect killing cells comprises a hood with a fan disposed therein, and wherein a circulation duct is provided outside of said circulation chamber, said circulation duct being equipped with a steam generator, a heating device, a cooling device and discharge ports.

3. The insect killing system as set forth in claim 1 wherein said differential insect killing cell comprises a hood adapted to be moved vertically by winding means, and a differential fan disposed in an upper opening of said hood, and a cover member for covering the outer side walls of a plurality of harvest boxes each of which is open on its top surface side and is formed in the side walls thereof with a large number of ventilating holes.

4. The insect killing system as set forth in claim 3 wherein said cover member is formed of a flexible and impermeable material such as a vinyl chloride sheet or film.

* * * * *